United States Patent [19]
Dietterich

[11] 3,923,355
[45] Dec. 2, 1975

[54] CABINET CONSTRUCTION FOR A REFRIGERATOR
[75] Inventor: Charles W. Dietterich, Columbus, Ohio
[73] Assignee: White-Westinghouse Corporation, Cleveland, Ohio
[22] Filed: June 14, 1974
[21] Appl. No.: 479,971

[52] U.S. Cl................................. 312/214; 220/9 G
[51] Int. Cl.²..................... A47B 81/00; B65D 25/18
[58] Field of Search.............. 312/214; 220/9 G, 9 F

[56] References Cited
UNITED STATES PATENTS
| | | | |
|---|---|---|---|
| 3,000,058 | 9/1961 | Thielen, Jr. | 312/214 |
| 3,221,085 | 11/1965 | Rill, Jr. et al. | 312/214 |
| 3,294,462 | 12/1966 | Kesling | 312/214 |
| 3,719,303 | 3/1973 | Kronenberger | 220/9 F |
| 3,813,137 | 5/1974 | Fellwock et al. | 220/9 G |

Primary Examiner—Paul R. Gilliam
Assistant Examiner—Alex Grosz
Attorney, Agent, or Firm—Strauch, Nolan, Neale, Nies & Kurz

[57] ABSTRACT

A refrigerator having a metal outer wrapper separated from a plastic inner liner by foamed-in-placed insulation is shown wherein the inner liner is selectively coated on the surface adjacent the insulation and in areas corresponding to points of stress concentration by a release agent (PVA) with the entire surface facing the foam insulation thereafter coated with an elastomeric adhesive material (latex) providing mimimal bonding between the insulation and plastic liner in those areas of stress concentration and an elastomeric interface between the plastic liner and the foam insulation to reduce the forces transmitted to the plastic liner as a result of the different rates of expansion or contraction of the inner liner and the outer shell.

9 Claims, 3 Drawing Figures

CABINET CONSTRUCTION FOR A REFRIGERATOR

BACKGROUND OF THE INVENTION

1. Field of the Invention

This invention relates to refrigerators having a sandwiched or laminated cabinet construction of a metal outer shell and a plastic inner liner separated by foamed-in-place insulation generally bonding the two together, and more particularly to such construction including release agents selectively applied to the interface between the insulation and one of the walls to reduce the tensile stress imparted in the liner as a result of the different characteristics of expansion of the plastic and the metal.

2. Description of the Prior Art

Refrigerator cabinet constructions having a sandwiched or laminated wall structure of a metal outer wrapper and an inner plastic food liner maintained in a sufficiently structurally rigid relationship by foamed-in-place polyurethane foam insulation along with the attendant advantages and disadvantages of such construction is well documented in the prior art as, for example, in U.S. Pat. Nos. 3,719,303, 3,294,462. One of these known advantages of a plastic inner liner is its ability to be molded into a configuration providing shelf or drawer support structure. However, it is well known that plastic is generally weak in tension and also exhibits a coefficient of expansion on the order of six to seven times that of the metal outer wrapper. Taking these characteristics into consideration, it is realized that se- securely bonding the plastic liner to the metal cabinet through the adhesive qualities of the foamed-in-place insulation would result in the inner liner being subjected to tensioning forces whenever the inner liner was exposed to temperatures less than the outer wrapper. As this last condition, in fact, describes the general operating condition of the refrigerator, it was found to be necessary to alleviate the transmission of such forces to the inner liner by separating the inner liner from the foamed insulation by a parting agent which would then accommodate the variations in rates of expansion or contraction without developing the tensioning stress. However, heretofore, a single parting agent was applied either coextensive with the surface of the inner liner facing the insulation and thereby severely reduce the structural integrity of the complete cabinet structure, or by selectively applying a release agent in those areas of the inner liner facing the foamed insulation that corresponded to structure giving rise to stress concentrations. This latter arrangement, although obviously relieving the inner liner in those certain areas, in endeavoring to retain the structural integrity of the cabinet would, under extreme conditions, transmit sufficient tensioning stress to the inner liner to cause it to fracture, especially if accompanied by a sharp blow such as might be received during shipment of the unit. Any failure of the inner liner automatically resulted in destroying the complete refrigerator unit.

SUMMARY OF THE INVENTION

The present invention utilizes two known coating agents (i.e. latex and PVA), which have heretofore been used singly, preferably applied to the face of the inner liner adjacent the foamed insulation with the PVA coating those surfaces corresponding to areas of high stress concentration and the latex then applied to completely cover all areas facing the insulation. Applying the PVA allows the entire release of the so-coated areas from the polyurethane foam, which will prevent any cracking of the plastic food liner due to high stress concentrations whereas the latex allows an elastomeric interface adhering the food liner to the polyurethane foam to accommodate minor variations in the rate of contraction between the mating faces while maintaining sufficient bonding therebetween to retain the structural integrity of the laminated or sandwiched type construction.

DESCRIPTION OF THE PREFERRED EMBODIMENT

Figure 1:
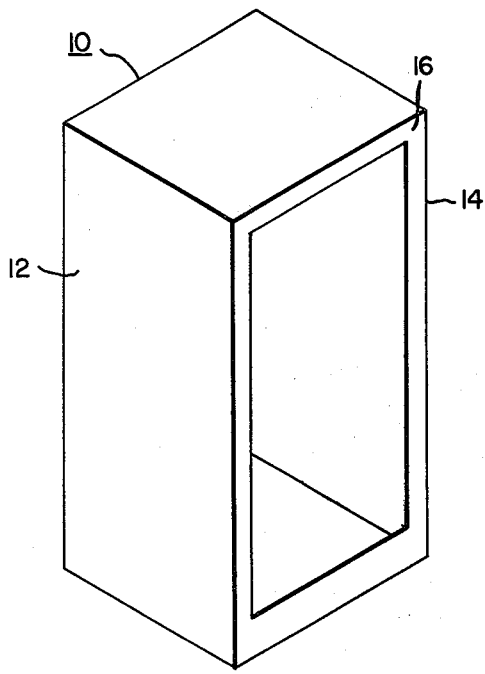
FIG. 1 is an isometric view of the outer wrapper and inner liner prior to assembly.

As is well known in the art, the cabinet of a foamed-in-place refrigerator comprises an outer wrapper 10 generally defining a forwardly open box having side walls 12 and 14 with the forwardly facing opening bounded by a peripheral flange, and an internally disposed food compartment liner 18 also generally defining a forwardly open box having side walls 20 and 22 with the forwardly facing opening also bounded by a peripheral flange 24 complementary to and cooperating with the flange 16 of the outer wrapper to position the inner liner within the outer wrapper with the opposing facing walls of each being in a spaced relationship to define a space therebetween into which is deposited a foamed-in-place polyurethane insulation which, when foamed and cured, generally adhesively bonds the food liner to the outer shell. In the cabinet construction of the present invention the outer shell 10 is preferably formed of sheet metal and the inner liner 18 is molded from a plastic such as acrylonitrile butadiene styrene copolymer (ABS). Under such conditions, it is to be understood that the coefficient of expansion of the two materials are sufficiently different (i.e. the coefficient of expansion of the plastic is on the order of six to seven times that of the metal) that as the temperatures to which they are exposed change and the material correspondingly expands or contracts, forces are generated which, are, as is well documented in the prior art, can cause the plastic inner liner to crack. As a general rule, the most critical forces are those developed when the inner liner 18 is subjected to a lower temperature than the outer shell whereby it would exhibit a tendency to contract much greater than the outer shell with the contraction being resisted by the bonding force of the foamed insulation thereby placing the plastic liner under tensile stress, with it being also well recognized that plastic is generally weak under tension.

A molded plastic inner liner such as 18 permits the inclusion within its configuration of structure such as shelf and drawer supports, and a contoured flange area, which heretofore were subsequently attached to an inner liner formed of metal sheet. Such molded structure, although being a definite advantage in the manufacture of refrigerator wall structure for that reason, has a disadvantage in that it aggrevates the stress problem by defining areas of stress concentration in the liner wall. In the present invention the shelf support structure is indicated as horizontally extending generally parallel spaced protuberances 26 on opposing side walls 20 and 22 of the inner liner 18. It is to be understood that such shelf support structure or protuberances molded into the side walls of the plastic liner can take any desired configuration with that being shown only illustrative of one such arrangement. Further, it is well recognized that the contoured flange 24 around the periphery of the forwardly facing opening of the inner liner defines another area of potential stress concentration if not permitted to expand or contract somewhat independently of the adjacent metal wrapper.

As explained in the description of the prior art, to relieve the defined areas from stresses that may normally cause a cracking or fracture in the inner liner, a parting agent was coated thereon so that the foam was not completely bonded to the inner liner within these areas. Such parting agent is indicated in the shaded area 28 and employed in the present invention for the same purpose as previously used. However, with reference to FIG. 2, it is shown that in addition, the sandwiched construction of the wall structure of the refrigerator cabinet includes a further layer of an elastic material 32 having adhesive qualities applied over the entire surface of the inner liner thereby resulting in a laminated wall structure, of a metal outer cabinet adhesively attached to the foamed insulation 30 which is in facing substantially bonded engagement with a layer of elastic material such as latex (an example of a commercially available latex being Firestone's FRN-400 latex) 32 and, in those areas of stress concentration, overlying a layer of a release agent such as polyvinyl alcohol (PVA) 34 deposited coextensive with such areas of stress concentration on the inner liner 18. Although the layers of the latex 32 and the PVA release agent 34 are indicated as having some thickness, it is to be understood that such coatings are generally sprayed onto the surface resulting in depositing a film on the order of 1 to 2 mils in thickness. Also, it is to be noted that in those sections of the wall structure absent of the stress concentration feature in the inner liner, the sandwich construction would include only the latex elastically bonding the inner liner to the foamed insulation.

Figure 2:
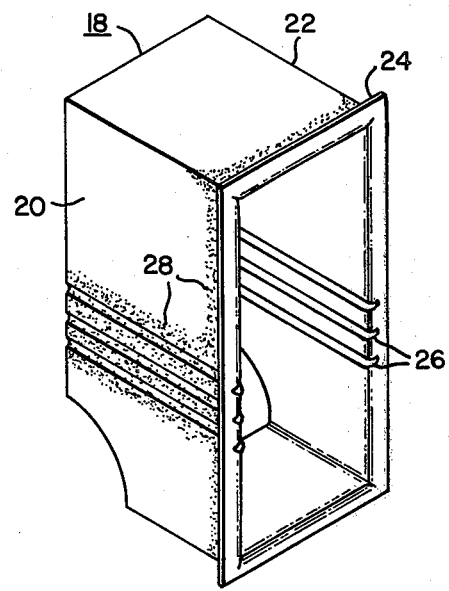
FIG. 2 is an elevational cross-sectional view of the sandwiched construction of the cabinet side wall in an area of stress concentration.
Figure 2:
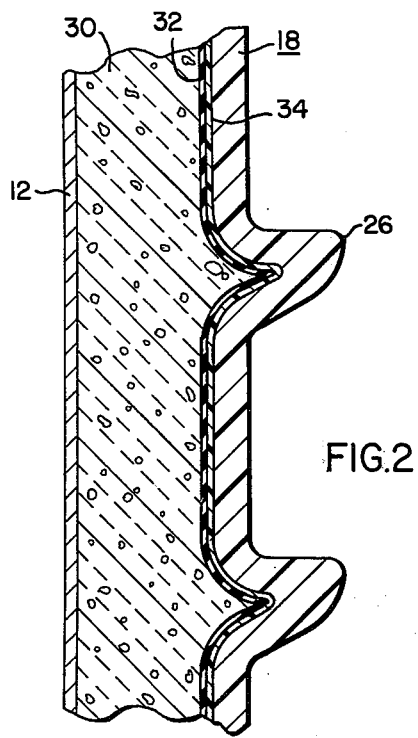
Figure 3:
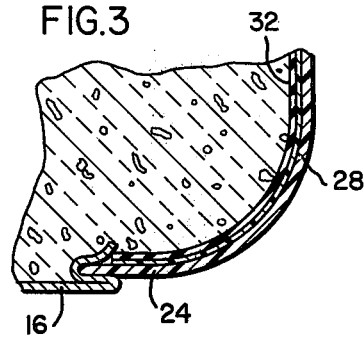
FIG. 3 is a cross-sectional plan view of the front flange area of the cabinet wall showing the sandwiched construction in yet another high stress area.

FIG. 3, in that it illustrates the throat or peripheral contoured flange surrounding the opening of the inner liner, describes another area of stress concentration and thus also includes the sandwiched or laminated wall construction described in FIG. 2 in that both the PVA release agent is deposited on the surface of the liner with the latex being deposited thereover.

Although the above-described laminated construction discloses the PVA release agent being applied only to those areas corresponding to stress concentrations with the latex then being applied over the entire surface of the inner liner including those portions previously coated by the PVA, it is only to indicate that, the respective coatings are preferably for economic reasons sprayed on in the absence of any masking technique to selectively define the areas on which they are to be applied. However, the same result could be achieved by applying the PVA release agent on those areas of the inner liner corresponding to areas of stress concentration and then selectively applying the latex only to the remaining areas of the inner liner whereby the areas of stress concentration are generally free of the bonding of the foamed insulation and the remaining areas are bonded to the foamed insulation through an elastic plane that permits limited expansion or contraction of the inner liner independent of the foamed insulation without developing critical stresses.

Thus a refrigerator cabinet construction is shown using two distinct parting agents, one to sufficiently release the areas of stress concentration on an inner plastic food liner for free contraction or expansion thereof irrespective of the metal cabinet and the other to retain structural integrity between the liner and the outer cabinet through an adhesive bonding by an elastic interface that permits limited movement. Thus contracting or expanding movement of the inner liner is permitted without developing forces causing critical stress on the inner liner.

I claim:

1. A refrigerator cabinet having a laminated wall construction including an outer metal layer, an inner plastic layer having predetermined areas therein susceptible to stress concentration when said plastic layer is subjected to tensioning forces, an intermediate core of foamed insulation adherent to one of said layers substantially throughout the interface between said insulation and said one of said layers,
   a coating of a release agent interposed between said insulation and the other of said layers in predetermined areas generally coextensive with at least certain of said areas susceptible to stress concentration and,
   a coating of an elastomeric adhesive interposed between said insulation and said other of said layers substantially throughout the extent of at least the remaining interface of said insulation and said other of said layers whereby limited movement of said other of said layers with respect to said insulation is permitted.

2. A refrigerator cabinet according to claim 1 wherein said one of said layers is said outer metal layer and said other of said layers is said inner plastic layer.

3. A refrigerator cabinet according to claim 2 wherein said release agent is a polyvinyl alcohol.

4. A refrigerator cabinet according to claim 2 wherein said elastomeric adhesive is a latex.

5. A refrigerator cabinet according to claim 2 wherein said coating of said elastomeric adhesive extends over areas on said inner plastic layer including said predetermined areas coated by said release agent.

6. An improved cabinet construction for a refrigerator having an outer metal wrapper and a molded plastic inner liner separated by a core of foamed-in-place insulation, and wherein said liner includes predetermined areas susceptible to stress concentration when said liner is subjected to tensioning forces, said improvement comprising:
   a first parting agent selectively applied to predetermined areas on the surface of said inner liner facing said insulation generally coextensive with said areas susceptible to stress concentration; and,
   a second parting agent having elastomeric adhesive characteristics applied to substantially at least the remaining surface of said inner liner facing said insulation.

7. Structure according to claim 6 wherein said first parting agent is a polyvinyl alcohol.

8. Structure according to claim 6 wherein said second parting agent is a latex.

9. Structure according to claim 6 wherein said second parting agent is applied generally throughout the interface between said inner liner and said insulation including said areas susceptible to stress concentration.

* * * * *